United States Patent
Porsch et al.

(10) Patent No.: US 9,002,480 B2
(45) Date of Patent: Apr. 7, 2015

(54) METHOD FOR OPERATION OF A CONTROL NETWORK, AND A CONTROL NETWORK

(75) Inventors: Roland Porsch, Speichersdorf (DE); Hartmut Ludwig, West Windsor, NJ (US); Andreas Ziegler, Schwarzenbruck (DE); Tino Schwarz, Erlangen (DE); Andreas Kirsch, Hemhofen (DE)

(73) Assignee: Siemens Aktiengesellschaft, Munich (DE)

( * ) Notice: Subject to any disclaimer, the term of this patent is extended or adjusted under 35 U.S.C. 154(b) by 684 days.

(21) Appl. No.: 13/272,260

(22) Filed: Oct. 13, 2011

(65) Prior Publication Data

US 2013/0096696 A1  Apr. 18, 2013

(51) Int. Cl.
  *G05B 19/18*  (2006.01)
  *G06F 11/20*  (2006.01)
  *G06F 11/14*  (2006.01)

(52) U.S. Cl.
  CPC ........ *G06F 11/2038* (2013.01); *G06F 11/1425* (2013.01); *G06F 11/2028* (2013.01); *G06F 11/2046* (2013.01)

(58) Field of Classification Search
  CPC ...................... H04L 12/40202; G06F 11/2005
  USPC .......................................................... 700/3
  See application file for complete search history.

(56) References Cited

U.S. PATENT DOCUMENTS

| | | | |
|---|---|---|---|
| 5,021,938 A * | 6/1991 | Hayakawa | 700/3 |
| 5,682,139 A * | 10/1997 | Pradeep et al. | 340/539.13 |
| 6,134,579 A * | 10/2000 | Tavallaei et al. | 718/100 |
| 6,163,853 A * | 12/2000 | Findlay et al. | 714/4.4 |
| 7,734,948 B2 * | 6/2010 | Langford et al. | 714/4.1 |
| 2006/0004920 A1 * | 1/2006 | Hallenbeck | 709/224 |
| 2011/0161538 A1 * | 6/2011 | Decker | 710/110 |

FOREIGN PATENT DOCUMENTS

WO   WO 2006083416 A3 *  2/2008  ............ G06F 7/06

OTHER PUBLICATIONS

Wikipedia, The Free Encyclopedia, "Heartbeat", Retrieved from Internet Sep. 16, 2011, http://de.wikipedia.orglwiki/Heartbeat, pp. 1-2, English version http://en.wikipedia.org/wiki/Linux-HA pp. 1-2.*

(Continued)

*Primary Examiner* — Robert Fennema
*Assistant Examiner* — Sivalingam Sivanesan
(74) *Attorney, Agent, or Firm* — Laurence A. Greenberg; Werner H. Stemer; Ralph E. Locher

(57) ABSTRACT

A method for operating a control network includes a first control computer, a second redundant control computer and a plurality of data-processing appliances, wherein a connection between the computers and the appliances is provided by a redundant and diverse heartbeat. The connection between the computers is checked before operating the control network. If a test result is positive, a master function is assigned to the first computer. If the test result is negative, both computers connect the appliances to themselves in a defined sequence. When a predetermined number of appliances are connected to the first computer, the computer takes over a master function and the second computer takes over a standby function, or, when a number, which is less than the predetermined number, of appliances are connected to each of the two computers, a signal is produced which signals a fault state of the control network.

8 Claims, 1 Drawing Sheet

(56) References Cited

OTHER PUBLICATIONS

Wikipedia, The Free Encyclopedia, "Semaphone (programming)", Retrieved from Internet Sep. 16, 2011, pp. 1-5.*

Wikipedia, The Free Encyclopedia, "Heartbeat", Retrieved from Internet Sep. 16, 2011, http://de.wikipedia.org/wiki/Heartbeat, pp. 1-2, English version http://en.wikipedia.org/wiki/Linux-HA pp. 1-2.

* cited by examiner

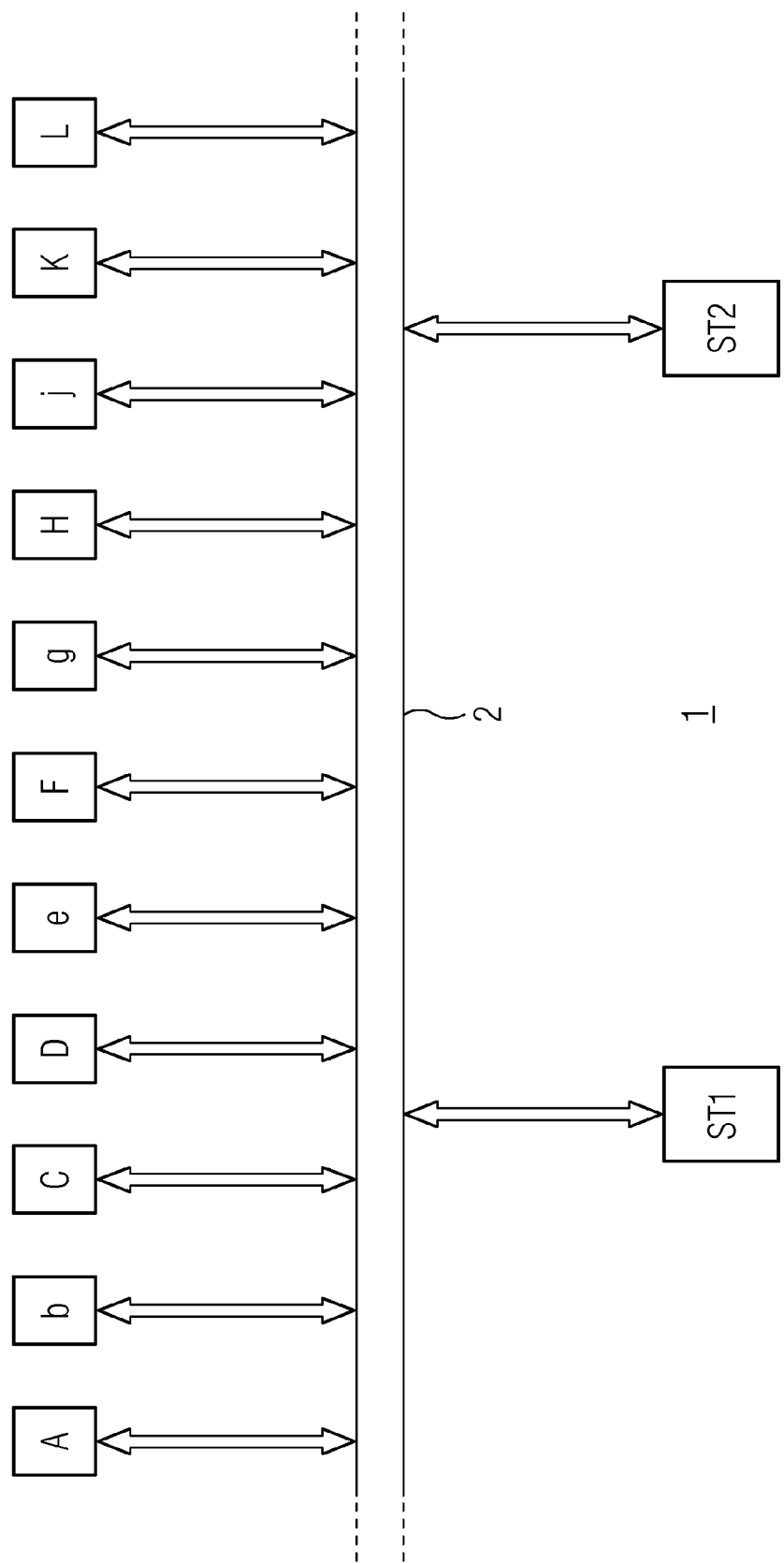

METHOD FOR OPERATION OF A CONTROL NETWORK, AND A CONTROL NETWORK

FIELD OF INVENTION

The claimed invention relates to a method for operation of a control network and to a control network.

BACKGROUND OF INVENTION

It is known for technical devices to be designed in a redundant form when high availability is required. This also applies to rail vehicles which are designed to be redundant to the extent that they have a second control computer in addition to a first control computer. Various appliances in the rail vehicle can be controlled via the rail vehicle's own data line network by the control computers; these appliances may be functionally important appliances or appliances which are not necessarily required for functionality of the rail vehicle.

In order to avoid more than one computer carrying out the function of a master in a control network such as this, it is known for the control computers to be coupled to one another via more than one physical connection (redundant connection). This redundant connection can be used to identify whether the second control computer, which is acting as a standby computer, has failed, or whether there is a communication fault.

SUMMARY OF INVENTION

An object of the claimed invention is to provide a method for operation of a control network with two control computers for redundancy reasons, which method can be carried out safely with comparatively little complexity.

According to the invention, this object is achieved by a method for operation of a control network having a single physical connection between a first control computer and a second redundant control computer via a data line network is suitable for being connected to the plurality of functionally important, data-processing appliances. The data connection between the control computers and the functionally important appliances is provided by means of a redundant and diverse heartbeat, with the communication connection between the two control computers being checked in order to start operation of the control network. If the test result is positive, a master function is assigned to a control computer, or if the test result is negative, both control computers connect the functionally important appliances to themselves in a defined sequence. When a predetermined number of functionally important appliances are connected to one of the two control computers, this takes over the master function and the other control computer takes over the standby function, or when a number which is less than the predetermined number of functionally important appliances are connected to each of the two control computers, a signal is produced which signals a fault state of the control network.

One advantage of the method according to the invention is that there is no need for a second or redundant connection between the two control computers, because the direct communication between the two control computers and the connection of data-processing appliances to the control network implement a redundant and diverse heartbeat. A heartbeat such as this is described briefly, for example, in the Internet publication "Heartbeat" of Wikipedia, the free encyclopedia.

In this case, furthermore, this advantageously reliably prevents the possibility of a master function being assigned to both control computers at the same time. This is necessary for safety reasons.

In one advantageous embodiment of the method according to the invention, when the first control computer is being operated as the master function and the second control computer is being operated in the standby mode and when a communication failure is found by them mutually, the first control computer retains its function as long as it accesses the predetermined number of functionally important appliances and, at the same time, the second control computer tests whether the functionally important appliances are switched on and are not being used by the first control computer. For functionally important appliances which are not being used by the first control computer, the second control computer on the one hand uses these appliances and, on accessing the predetermined number of these appliances, takes over the master function and, if it does not access them, retains the standby function while signaling a fault state of the control network.

This refinement of the method according to the invention has the particular advantage that the two control computers cannot carry out the master function at the same time even though they can no longer communicate with one another in the event of a fault. Even in the particularly critical situation in which a communication fault has occurred as a result of an interruption in the data line network, it is not possible for both control computers to each carry out a master function at the same time with in each case some of the functionally important, data-processing appliances. The functionality, and in particular the functional safety, of the method according to the invention is therefore comparatively high.

In the method according to the invention, the predetermined number of functionally important data-processing appliances which are provided for maintaining the master function may be defined to be of different magnitude. In order to achieve high functionality, it appears to be advantageous for half of the appliances to be defined as the predetermined number of functionally important appliances.

It is considered to be advantageous for each control computer to operate as a semaphore with respect to the functionally important appliances, because this does not relate to connected individual functionally important devices, but rather in each case only to maintenance of the predetermined number for the master function. Brief introductory statements relating to a semaphore can be found in the Internet publication "Semaphore (programming)" of Wikipedia, the free encyclopedia.

The invention furthermore relates to a control network having two control computers for redundancy reasons, and is based on the object of providing a control network such as this with a comparatively high safety function with relatively low costs.

In order to achieve this object, according to the invention, in the case of a control network having a single physical connection between a first control computer and a second redundant control computer via a data line network to which a plurality of functionally important, data-processing appliances are connected, the data connection between the control computers and the functionally important appliances being provided by means of a redundant and diverse heartbeat. In this case, reference is made only to the literature references cited above with regard to the configuration of the heartbeat.

It is considered to be advantageous for each control computer to be designed such that it operates as a semaphore with respect to the functionally important appliances.

It is also advantageous for the functionally important appliances to be designed such that they output a "functionally important" tag in their output signal.

The control network according to the invention can be used particularly advantageously for rail-bound vehicles, in that the first control computer is accommodated in a first section of the rail vehicle, which is connected via a coupling to a second section of a rail vehicle, and the single physical connection passes via the coupling. This makes it possible to considerably reduce the wiring complexity, and to design the coupling to be relatively simple.

BRIEF DESCRIPTION OF THE DRAWINGS

In order to explain the invention further, the FIGURE illustrates one exemplary embodiment of the control network according to the invention.

DETAILED DESCRIPTION OF INVENTION

The control network 1, as illustrated in the FIGURE, of a rail vehicle, for example, has a data line network with a data bus 2. A first control computer ST1 and a second redundant control computer ST2 are connected to the data bus 2, and a heartbeat network connection is set up between them. In addition, functionally important data-processing appliances A, C, D, F, H, K and L are connected to the data bus 2 and can be connected via a point-to-point connection to the control computers ST1 and ST2 using a semaphore; in this case, the functionally important appliances A, C, D, F, H, K and L may relate to a control network for a rail vehicle. Furthermore, further data-processing appliances b, e, g, and j are connected to the data bus 2, and these are not necessary for the operation, for example, of a rail vehicle.

The operation of the illustrated control network 1 is started by starting both control computers ST1 and ST2. If communication can be set up between the two control computers ST1 and ST2, then a master function is assigned to one of the two control computers.

If the communication connection is not set up, then the two control computers ST1 and ST2 attempt to connect the functionally important, data-processing appliances A, C, D, F, H, K and L to themselves in a defined sequence according to an existing list. For example, if the first control computer ST1 in this case finds that functionally important appliances among the appliances A, C, D, F, H, K and L are not switched off and are also not being used by the second control computer ST2, it connects these appliances to itself; if it finds in this case that it has connected at least a predetermined number of functionally important appliances A, C, D, F, H, K and L, for example four appliances A, C, D and F, to itself, then it automatically takes over the master function. The predetermined number should always comprise more than half of all the functionally important appliances A, C, D, F, H, K and L. The second control computer ST2 changes to the standby mode.

If the communication mentioned above has not been set up after the start of the two control computers ST1 and ST2 and the first control computer ST1 finds—contrary to the above description—that it cannot connect the predetermined number of functionally important appliances to itself, then it returns (standby function) and the second control computer ST2 takes over the master function subject to the precondition that it has been able to connect the predetermined number of functionally important appliances to itself. If this precondition is not satisfied, then the second control computer ST2 also changes to the standby mode.

A signal which identifies a fault state in the control network 1 can be derived from the situation with two control computers ST1 and ST2 in the standby mode. This also corresponds to the actual state of the control network 1, because this state has been brought about because there were not a sufficiently large number of functionally important appliances A, C, D, F, H, K and L available for connection for the two control computers ST1 and ST2. This signal is therefore also consistent with safety aspects.

If, after starting operation of the control network 1, and for example with the first control computer ST1 in the master function and the second control computer ST2 in the standby function, a communication failure occurs between the two control computers ST1 and ST2, the first control computer ST1 maintains its master function provided that, as before, it can access at least the predetermined number of functionally important appliances. However, the second control computer ST2 checks whether the functionally important appliances A, C, D, F, H, K and L are switched on and are not being used by the first control computer ST1. If it is found in this test that the functionally important appliances A, C, D, F, H, K and L are not being used by the first control computer ST1—for example because the first control computer ST1 has failed—then the second control computer ST2, which was previously in the standby mode, connects the functionally important appliances A, C, D, F, H, K and L to itself; if this is done with the predetermined number of them, then the second control computer ST2 takes over the master function. Otherwise, the second control computer ST2 is locked in the standby mode and does not take over the master function. This signals a severe restriction in the availability of the control network 1, and is consistent with safety aspects.

The invention claimed is:

1. A method for operation of a control network, comprising:

providing a first control computer and a second redundant control computer;

providing a single physical connection between the first control computer and the second redundant control computer via a data line network;

connecting a plurality of functionally important, data-processing appliances to the data line network, wherein a data connection between the first and second control computers and the functionally important appliances is provided by a redundant and diverse heartbeat;

starting operation of the control network, the starting comprising:

checking a communication connection between the two control computers;

if a result of the checking indicates that that the communication connection between the two control computers is set up, assigning a master function to the first control computer, and if the result of the checking indicates that that the communication connection between the two control computers is not set up:

attempting to connect both control computers to the functionally important data-processing appliances in a defined sequence, determining a number of functionally important data-processing appliances connected to the first control computer, comparing the number with a predetermined number, if the number is at least the predetermined number, taking over a master function by the first control computer and taking over a standby function by the second control computer, if the number is less than the predetermined number, taking over the standby function by the first computer, and if the master function is taken over neither by the first computer nor by the second computer, producing a signal which signals a fault state of the control network.

2. The method as claimed in claim 1, wherein, when the first control computer is being operated as the master function and the second control computer is being operated in the standby mode, and when a communication failure is found by the two control computers mutually:

the first control computer retains a function as long as the first control computer accesses the predetermined number of functionally important appliances and, at the same time, the second control computer tests whether the functionally important appliances are switched on and are not being used by the first control computer, for functionally important appliances, which are not being used by the first control computer, the second control computer uses the appliances which are not used by the first control computer, and, on accessing the predetermined number of the appliances, takes over the master function, or when the second control computer does not access the predetermined number of appliances, retains the standby function while signaling a fault state of the control network.

3. The method as claimed in claim 1, wherein half of the appliances is defined as the predetermined number of functionally important appliances.

4. The method as claimed in claim 1, wherein each control computer operates as a semaphore with respect to the functionally important appliances.

5. A control network, comprising:
a first control computer;
a second redundant control computer;
a physical connection between the first control computer and a second redundant control computer via a data line network;
a plurality of functionally important, data-processing appliances which are connected to the data line network, wherein a data connection between the two control computers and the functionally important appliances is provided by a redundant and diverse heartbeat;

wherein the control network is configured to perform a starting operation including:
checking a communication connection between the two control computers;
if a result of the checking indicates that that the communication connection between the two control computers is set up, assigning a master function to the first control computer; and
if a result of the checking indicates that that the communication connection between the two control computers is not set up, then:
attempting to connect both control computers to the functionally important data-processing appliances in a defined sequence,
determining a number of functionally important data-processing appliances connected to the first control computer,
comparing the number with a predetermined number,
if the number is at least the predetermined number, taking over a master function by the first control computer and taking over a standby function by the second control computer,
if the number is less than the predetermined number, taking over the standby function by the first computer, and
if the master function is taken over neither by the first computer nor by the second computer, producing a signal which signals a fault state of the control network.

6. The control network as claimed in claim 5, wherein each control computer is configured such that each control computer operates as a semaphore with respect to the functionally important appliances.

7. The control network as claimed in claim 5, wherein the functionally important appliances output a functionally important tag in an output signal.

8. The control network as claimed in claim 5, wherein the first control computer is accommodated in a first section of a rail vehicle, which is connected via a coupling to a second section of the rail vehicle, and wherein the physical connection passes via the coupling.

* * * * *